(12) United States Patent
Kuroiwa et al.

(10) Patent No.: US 11,168,201 B2
(45) Date of Patent: Nov. 9, 2021

(54) SILICA SOL DISPERSED IN KETONE SOLVENT AND RESIN COMPOSITION

(71) Applicant: NISSAN CHEMICAL CORPORATION, Tokyo (JP)

(72) Inventors: Kazuya Kuroiwa, Sodegaura (JP); Naohiko Suemura, Sodegaura (JP); Masatoshi Sugisawa, Sodegaura (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/270,926

(22) PCT Filed: May 13, 2020

(86) PCT No.: PCT/JP2020/019139
§ 371 (c)(1),
(2) Date: Feb. 24, 2021

(87) PCT Pub. No.: WO2020/230823
PCT Pub. Date: Nov. 19, 2020

(65) Prior Publication Data
US 2021/0309834 A1 Oct. 7, 2021

(30) Foreign Application Priority Data

May 14, 2019 (JP) .............................. JP2019-091301

(51) Int. Cl.
| C08K 9/04 | (2006.01) |
| C01B 33/146 | (2006.01) |
| C01B 33/145 | (2006.01) |
| C09C 1/30 | (2006.01) |
| C08K 3/36 | (2006.01) |

(52) U.S. Cl.
CPC .............. C08K 9/04 (2013.01); C01B 33/145 (2013.01); C01B 33/146 (2013.01); C08K 3/36 (2013.01); C09C 1/3063 (2013.01); *C01P 2004/64* (2013.01); *C01P 2006/12* (2013.01); *C08K 2201/005* (2013.01); *C08K 2201/011* (2013.01)

(58) Field of Classification Search
CPC ....... C08K 3/36; C08K 9/04; C08K 2201/005; C08K 2201/011; C01B 33/145; C01B 33/146; C09C 1/3063; C01P 2004/64; C01P 2006/12
See application file for complete search history.

(56) References Cited

U.S. PATENT DOCUMENTS

| 6,025,455 A * | 2/2000 | Yoshitake ............. C01B 33/145 |
| | | 106/287.12 |
| 2010/0137475 A1 | 6/2010 | Takeyama et al. |

FOREIGN PATENT DOCUMENTS

| JP | H11-043319 A | 2/1999 |
| JP | 2005-139295 A | 6/2005 |
| JP | 2005-200294 A | 7/2005 |
| JP | 2011-042527 A | 3/2011 |
| JP | 2015-038036 A | 2/2015 |
| JP | 2015-189638 A | 11/2015 |
| WO | 2009/008509 A1 | 1/2009 |

OTHER PUBLICATIONS

Jul. 28, 2020 Written Opinion issued in International Patent Application No. PCT/JP2020/019139.

* cited by examiner

*Primary Examiner* — Edward J Cain
(74) *Attorney, Agent, or Firm* — Oliff PLC (57) ABSTRACT

A silica-blended resin varnish contains a silica sol with a high dispersibility that is dispersed in a ketone organic solvent, in a nitrogen atom-containing polymer. The particles have an average size of 5 to 100 nm and have a carbon-carbon unsaturated bond-containing organic group and an alkoxy group bonded to surfaces thereof. The carbon-carbon unsaturated bond-containing organic group is bonded at 0.5 to 2.0 groups per unit area ($nm^2$) of the particle surfaces. The alkoxy group is bonded at 0.1 to 2.0 groups per unit area ($nm^2$) of the particle surfaces. The molar ratio of {(the carbon-carbon unsaturated bond-containing organic group)/(the alkoxy group)} is 0.5 to 5.0. The carbon-carbon unsaturated bond-containing organic group may be a phenyl group-containing organic group or a (meth)acryloyl group-containing organic group. An insulating resin composition contains the silica sol and a nitrogen-containing polymer, which may be polyimide, polyamide, polyamic acid, polyamide-imide, polyetherimide, or polyesterimide.

10 Claims, 1 Drawing Sheet

SILICA SOL DISPERSED IN KETONE SOLVENT AND RESIN COMPOSITION

TECHNICAL FIELD

The present invention relates to a silica sol dispersed in a ketone solvent, and a resin composition containing the silica sol and a nitrogen-containing polymer.

BACKGROUND ART

A method for producing an inorganic oxide sol dispersed in an organic solvent, such as toluene, is disclosed. The method includes causing hydroxyl groups on the surfaces of inorganic oxide particles, such as silica particles, to react with an alcohol so that alkoxyl groups are introduced to the surfaces of the inorganic oxide particles to form organic group-modified particles. In this method, a silica sol dispersed in a toluene solvent is prepared by causing a silica sol dispersed in methanol to react with phenyltrimethoxysilane (see Patent Document 1).

There is disclosed a silica sol produced by replacing the solvent of a silica sol dispersed in methanol with acetonitrile to form a silica sol dispersed in an acetonitrile-methanol mixed solvent and then causing the silica sol to react with phenyltrimethoxysilane (see Patent Document 2).

PRIOR ART DOCUMENTS

Patent Documents

Patent Document 1: JP 2005-200294 A
Patent Document 2: WO 2009/008509

SUMMARY OF THE INVENTION

Problems to be Solved by the Invention

An object of the present invention is to provide a silica sol dispersed in a ketone organic solvent for mixing silica particles and a polyimide or polyamide polar resin at high compatibility. In the present invention, the solvent of an aqueous silica sol is replaced with methanol and, for example, phenyltrialkoxysilane, which has a carbon-carbon unsaturated bond-containing organic group, is then caused to react with the silica sol to introduce a certain ratio of a phenyl group and an alkoxy group (especially methoxy group), so that silica particles have good hydrophilic/hydrophobic balance and show high dispersibility in the ketone organic solvent.

Means for Solving the Problems

According to the present invention, a first aspect is a sol (silica sol) in which silica particles are dispersed in a ketone solvent, the silica particles having an average particle size of 5 to 100 nm and having a carbon-carbon unsaturated bond-containing organic group and an alkoxy group bonded to surfaces thereof, wherein the carbon-carbon unsaturated bond-containing organic group is bonded at 0.5 to 2.0 groups per unit area (nm²) of the surfaces of the silica particles, the alkoxy group is bonded at 0.1 to 2.0 groups per unit area (nm²) of the surfaces of the silica particles, and a molar ratio of {(the carbon-carbon unsaturated bond-containing organic group)/(the alkoxy group)} is 0.5 to 5.0.

According to a second aspect, in the silica sol according to the first aspect, the carbon-carbon unsaturated bond-containing organic group is a phenyl group or a phenyl group-containing organic group, or a (meth)acryloyl group or a (meth)acryloyl group-containing organic group.

According to a third aspect, in the silica sol according to the first aspect, the carbon-carbon unsaturated bond-containing organic group is a phenyl group, a phenylaminoalkyl group, a (meth)acryloyl group, or a (meth)acryloylalkyl group.

According to a fourth aspect, in the silica sol according to any one of the first to third aspects, the ketone solvent is dimethylacetamide, N-methylpyrrolidone, N-ethylpyrrolidone, γ-butyrolactone, or cyclohexanone.

According to a fifth aspect, in the silica sol according to any one of the first to third aspects, the ketone solvent is at least one nitrogen-containing ketone solvent selected from the group consisting of dimethylacetamide, N-methylpyrrolidone, N-ethylpyrrolidone, and γ-butyrolactone.

According to a sixth aspect, an insulating resin composition includes: the silica sol according to any one of the first to fifth aspects; and a nitrogen-containing polymer.

According to a seventh aspect, in the insulating resin composition according to the sixth aspect, the nitrogen-containing polymer is present at 1 to 100 parts by mass with respect to 1 part by mass of silica contained in the silica sol.

According to an eighth aspect, in the insulating resin composition according to the sixth or seventh aspect, the nitrogen-containing polymer is polyimide, polyamide, polyamic acid, polyamide-imide, polyetherimide, or polyesterimide.

According to a ninth aspect, a method for producing the silica sol according to any one of the first to fifth aspects includes the following steps (A) to (D):

step (A): a step of preparing an aqueous silica sol having an average particle size of 5 to 100 nm;

step (B): a step of replacing an aqueous medium of the aqueous silica sol with methanol;

step (C): a step of causing the silica sol dispersed in methanol prepared in step (B) to react with a silane coupling agent represented by the following formula (1); and step (D): a step of replacing a methanol solvent of the surface-modified silica sol dispersed in methanol prepared in step (C) with a ketone solvent,            Formula (1)

[in the formula (1), R¹ represents a carbon-carbon unsaturated bond-containing organic group, R² represents an alkoxy group, an acyloxy group, or a halogen group, and a represents an integer of 1 to 3].

According to a tenth aspect, in the method for producing the silica sol according to the ninth aspect, the reaction in step (C) proceeds at 40° C. to 100° C. for 0.1 to 20 hours.

Effects of the Invention

Wire materials and substrate materials need to have high electrical insulation as well as high impact resistance and high abrasion resistance. Examples of resins having high electrical insulation include polymers containing carbonyl groups and nitrogen atoms, such as polyimide, polyamide, polyimide-amide, and polyesterimide.

The introduction of nanoscale silica particles to these polymers at high compatibility preferably uses a silica sol dispersed in an organic solvent containing silica particles having high dispersibility in a dispersion medium. The silica sol dispersed in the organic solvent can be mixed with a polymer at high compatibility to form a varnish because the dispersion medium of the silica sol dispersed in the organic solvent has a structure very similar to the polymer structure. The use of a ketone solvent as such a dispersion medium enables silica particles to be mixed well with the above resins and provides a non-cloudy varnish of a silica-dispersed resin composition after mixing.

It is found that the dispersion of silica particles in a ketone solvent requires a certain ratio of hydrophilicity and hydrophobicity on the surfaces of the silica particles, and the dispersibility of silica particles in a ketone solvent is improved by setting the ratio between an alkoxy group (especially methoxy group) and a carbon-carbon unsaturated bond-containing organic group, such as phenyl group, bonded to the surfaces of the silica particles in a certain range in terms of molar ratio. Description is provided by using a phenyl group as an example carbon-carbon unsaturated bond-containing organic group. In the silica particles having silanol groups in the present invention, the hydroxyl groups of silanol groups and the methoxy groups formed by methoxylation of silanol groups with methanol solvent reach equilibrium in methanol solvent. In this state, the silica particles are caused to react with hydrolyzable silane (silane coupling agent) having a carbon-carbon unsaturated bond-containing organic group, such as phenyltrialkoxysilane, so that silanol group moieties react with the hydrolyzable silane to form silica particles having a certain ratio of an alkoxy group (especially methoxy group) and a phenyl group.

In the equilibrium between the hydroxyl groups of silanol groups and the methoxy groups formed by methoxylation of silanol groups with methanol solvent, the water content in the methanol solvent is preferably 3% by mass or less, for example, preferably 2% by mass or less.

If silica particles react with phenyltrialkoxysilane in an aqueous silica sol in the present invention, the absence of functional groups having intermediate hydrophobic/hydrophilic properties, such as alkoxy groups (especially methoxy group), leads to low hydrophilic/hydrophobic balance even in the presence of the initially present silanol groups and the phenyl groups introduced by the reaction. Therefore, the silica particles are unstable when being used in varnish, and the aggregation of silica particles leads to low transparency.

If methoxy groups once formed by methoxylation return into silanol groups due to the influence of contained water in the present invention, the silanol groups efficiently react with phenyltrialkoxysilane because of a small number of methoxy groups. As a result, the number of phenyl groups introduced increases while remaining silanol groups are present, and hydrophobic moieties and hydrophilic moieties are scattered in the silica particles. In terms of such hydrophilic/hydrophobic balance of silica particles, the silica particles show low dispersibility in ketone solvents and low compatibility with polar polymers containing carbonyl groups and nitrogen atoms. Therefore, the silica particles are unstable when being used in varnish, and the aggregation of silica particles leads to low transparency.

If silica particles react with phenyltrialkoxysilane after replacement of methanol solvent with a ketone solvent in the present invention, the ketone does not react with the silanol in the ketone solvent, and the silanol groups remain. The silanol groups efficiently react with phenyltrialkoxysilane since there are almost no methoxy groups. As a result, the amount of phenyl groups introduced increases, but hydrophobic moieties and hydrophilic moieties are scattered in the silica particles because of the effect of remaining silanol groups. In terms of such hydrophilic/hydrophobic balance of silica particles, the silica particles show low dispersibility in ketone solvents and low compatibility with polar polymers containing carbonyl groups and nitrogen atoms. Therefore, the silica particles are unstable when being used in varnish, and the aggregation of silica particles leads to low transparency.

In the present invention, the silica sol dispersed in methanol appropriately contains silanol groups and methoxy groups. When reacting with phenyltrialkoxysilane, the silica sol dispersed in methanol contains phenyl groups serving as hydrophobic groups and methoxy groups serving as suitable hydrophilic groups on the surfaces of the silica particles in a well-balanced manner. It is thus considered that the silica particles show high dispersibility in ketone solvents and good compatibility with polar polymers containing carbonyl groups and nitrogen atoms.

The stability of the silica particles in varnish can be visually observed on the basis of cloudiness and change in viscosity of varnish. The stability can be rated high when varnish is not cloudy from appearance observation and when the change in viscosity after storage for about 2 weeks at room temperature from the initial viscosity is 30% or less.

BRIEF DESCRIPTION OF THE DRAWINGS

In FIG. 1, the number (1) shows "the state of a polyamide-imide resin varnish of reference", the number (2) shows "the state of a silica-blended polyamide-imide resin varnish of Comparative Example 2", and the number (3) shows "the state of a silica-blended polyamide-imide resin varnish of Example 2".

MODES FOR CARRYING OUT THE INVENTION

The present invention is directed to a sol (silica sol) in which silica particles are dispersed in a ketone solvent. The silica particles have an average particle size of 5 to 100 nm and have a carbon-carbon unsaturated bond-containing organic group and an alkoxy group bonded to surfaces thereof. The carbon-carbon unsaturated bond-containing organic group is bonded at 0.5 to 2.0 groups per unit area ($nm^2$) of the surfaces of the silica particles. The alkoxy group is bonded at 0.1 to 2.0 groups per unit area ($nm^2$) of the surfaces of the silica particles. The molar ratio of {(the carbon-carbon unsaturated bond-containing organic group)/(the alkoxy group)} is 0.5 to 5.0.

The functional groups bonded to the surfaces of the silica particles in the present invention include an alkoxy group (especially methoxy group) and a carbon-carbon unsaturated bond-containing organic group.

The carbon-carbon unsaturated bond-containing organic group is a phenyl group or a phenyl group-containing organic group, or a (meth)acryloyl group or a (meth)acryloyl group-containing organic group.

In the case of using phenyltrialkoxysilane, silanol groups formed by hydrolysis of the alkoxy groups of phenyltrialkoxysilane react with silanol groups of silica particles to form phenyl groups through siloxane bonding.

Examples of the phenyl group include substituted or unsubstituted phenyl groups. The substituent is, for example, an alkyl group, a halogenated alkyl group, an alkoxy aryl group, an alkenyl group; or an organic group having an epoxy group, an acryloyl group, a methacryloyl group, a mercapto group, an amino group, or a cyano group; or a combination thereof. The phenyl group may be directly bonded to a silicon atom or may be bonded to a silicon atom via a $C_{1-10}$ alkylene group. The phenyl group may be bonded to a silicon atom via a functional group having a nitrogen atom, a sulfur atom, or an oxygen atom.

In the silane coupling agent of the formula (1), a is 1 to 3. The silane coupling agent where a=1 is preferably used, and the hydrolyzable groups of three $R^{2}$'s can react with silanol groups of silica particles. The forms of the silane coupling agent are as described below. The surface modification in the surface-modified silica particles of the present invention may be one of, or a combination of two or more of the following formulas (1-1), (1-2), and (1-3).

Formula (1-1)

Formula (1-2)

Formula (1-3)

In formulas (1-1), (1-2), and (1-3), $R^1$ is the carbon-carbon unsaturated bond-containing organic group. $R^2$ is an alkoxy group, an acyloxy group, or a halogen group and represents a hydrolyzable group. $SiO_2$ represents a silica particle.

The (meth)acryloyl group may be directly bonded to a silicon atom, or may be bonded to a silicon atom via a $C_{1-10}$ alkylene group. The (meth)acryloyl group may be bonded to a silicon atom via a functional group having a nitrogen atom, a sulfur atom, or an oxygen atom.

The alkyl group is a linear or branched $C_{1-10}$ alkyl group. Examples of the alkyl group include, but are not limited to, methyl, ethyl, n-propyl, i-propyl, n-butyl, i-butyl, s-butyl, t-butyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, and 1-ethyl-2-methyl-n-propyl groups.

The alkylene group is an alkylene group derived from the above alkyl group.

The halogenated alkyl group means a monovalent group formed by substituting one hydrogen atom of the alkyl group with a halogen. Examples of the halogen include fluorine, chlorine, bromine, and iodine atoms.

The alkoxy aryl group means a monovalent group formed by substituting one hydrogen atom of the following aryl group with the following alkoxy group.

The aryl group is, for example, a $C_{6-40}$ aryl group. Examples of the aryl group include, but are not limited to, phenyl, o-methylphenyl, m-methylphenyl, p-methylphenyl, o-chlorophenyl, m-chlorophenyl, p-chlorophenyl, o-fluorophenyl, p-mercaptophenyl, o-methoxyphenyl, p-methoxyphenyl, p-aminophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl, and 9-phenanthryl groups.

The alkenyl group is, for example, a $C_{2-10}$ alkenyl group. Examples of the alkenyl group include, but are not limited to, ethenyl, 1-propenyl, 2-propenyl, 1-methyl-1-ethenyl, 1-butenyl, 2-butenyl, 3-butenyl, 2-methyl-1-propenyl, 2-methyl-2-propenyl, 1-ethylethenyl 1-methyl-1-propenyl, 1-methyl-2-propenyl, 1-pentenyl, 2-pentenyl, 3-pentenyl, 4-pentenyl, 1-n-propylethenyl, 1-methyl-1-butenyl, 1-methyl-2-butenyl, 1-methyl-3-butenyl, 2-ethyl-2-propenyl, 2-methyl-1-butenyl, 2-methyl-2-butenyl, 2-methyl-3-butenyl, 3-methyl-1-butenyl, 3-methyl-2-butenyl, 3-methyl-3-butenyl, 1,1-dimethyl-2-propenyl, 1-i-propylethenyl, 1,2-dimethyl-1-propenyl, and 1,2-dimethyl-2-propenyl groups.

Examples of the organic group having an epoxy group include, but are not limited to, glycidoxymethyl, glycidoxyethyl, glycidoxypropyl, glycidoxybutyl, and epoxycyclohexyl.

Examples of the organic group having a mercapto group include, but are not limited to, ethyl mercapto, butyl mercapto, hexyl mercapto, and octyl mercapto.

The term "(meth)acryloyl group", as used herein, refers to both an acryloyl group and a methacryloyl group.

The (meth)acryloyl alkyl group means a monovalent group formed by substituting a hydrogen atom of the alkyl group with (meth)acryloyl.

Examples of the organic group having a cyano group include, but are not limited to, cyanoethyl and cyanopropyl.

The $C_{1-10}$ alkoxy group is, for example, a $C_{1-10}$ alkoxy group having a linear, branched, or cyclic alkyl moiety. Examples of the $C_{1-10}$ alkoxy group include, but are not limited to, methoxy, ethoxy, n-propoxy, i-propoxy, n-butoxy, i-butoxy, s-butoxy, t-butoxy, n-pentyloxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy, n-hexyloxy, 1-methyl-n-pentyloxy, and 2-methyl-n-pentyloxy groups.

Examples of the $C_{2-20}$ acyloxy group include, but are not limited to, methylcarbonyloxy, ethylcarbonyloxy, n-propylcarbonyloxy, i-propylcarbonyloxy, n-butylcarbonyloxy, i-butylcarbonyloxy, s-butylcarbonyloxy, t-butylcarbonyloxy, n-pentylcarbonyloxy, 1-methyl-n-butylcarbonyloxy, 2-methyl-n-butylcarbonyloxy, and 3-methyl-n-butylcarbonyloxy groups.

Examples of the halogen group include fluorine, chlorine, bromine, and iodine.

Specific examples of the formula (1) include, but are not limited to, phenyltrimethoxysilane, phenyltriethoxysilane, hydroxyphenyltrimethoxysilane, hydroxyphenyltriethoxysilane, phenylaminotrimethoxysilane, phenylaminotriethoxysilane, and methacryloyloxypropyltrimethoxysilane, methacryloyloxypropyltriethoxysilane, acryloyloxypropyltrimethoxysilane, and acryloyloxypropyltriethoxysilane.

The surface modification of silica particles in the present invention can use a hydrolyzable silane compound(s) of the formula (2) and/or the formula (3) in combination with the silane coupling agent of the formula (1).

Formula (2)

Formula (3)

In the formula (2), $R^3$ represents an alkyl group, a halogenated alkyl group, or an organic group having an epoxy group, a mercapto group, an amino group, or a cyano group, or a combination thereof, $R^4$ represents an alkoxy group, an acyloxy group, or a halogen group, and b represents an integer of 1 to 3.

The alkyl group, the halogenated alkyl group, or the organic group having an epoxy group, a mercapto group, an amino group, or a cyano group represented by $R^3$, and the alkoxy group, the acyloxy group, or the halogen group represented by $R^4$ may be the examples described above.

In the formula (3), $R^5$ represents an alkyl group bonded to a silicon atom through Si—C bonding, $R^6$ represents an alkoxy group, an acyloxy group, or a halogen group, Y represents an alkylene group, an arylene group, a NH group, or an oxygen atom, c represents an integer of 0 to 3, and d represents an integer of 0 or 1. These functional groups may be the examples described above.

Examples of the arylene group include groups formed by removing one hydrogen atom from the above aryl groups.

Examples of the hydrolyzable silane compound represented by the formula (2) include, but are not limited to, methyltrimethoxysilane, methyltrichlorosilane, methyltriacetoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethylsilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, ethyltrimethoxysilane, ethyltriethoxysilane, γ-chloropropyltrimethoxysilane, γ-chloropropyltriethoxysilane, γ-chloropropyltriacetoxysilane, 3,3,3-trifluoropropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, dimethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-mercaptopropylmethyldimethoxysilane, γ-mercaptomethyldiethoxysilane, trimethylmethoxysilane, trimethylchlorosilane, trimethylacetoxysilane, trimethylpropoxysilane, trimethylacetoxysilane, trimethylbutoxysilane, trimethylpropoxysilane, trimethylamyloxysilane, trimethylphenoxysilane, and trimethylbenzyloxysilane.

Examples of the hydrolyzable silane compound represented by the formula (3) include, but are not limited to, methylenebistrimethoxysilane, methylenebistrichlorosilane, methylenebistriacetoxysilane, ethylenebistriethoxysilane, ethylenebistrichlorosilane, ethylenebistriacetoxysilane, propylenebistriethoxysilane, butylenebistrimethoxysilane, bistrimethoxydisilane, bistriethoxydisilane, bisethyldiethoxydisilane, and bismethyldimethoxydisilane.

Examples of the hydrolyzable silane compound represented by the formula (3) include the following compounds.

Formula (3-1)

Formula (3-2)

Formula (3-3)

The formula (3-1) represents hexamethyldisilazane, the formula (3-2) represents hexamethyldisilane, and the formula (3-3) represents hexamethyldisiloxane. These silylating agents are available from Tokyo Chemical Industry Co., Ltd.

The ketone solvent of the present invention is a linear or cyclic, aliphatic or aromatic compound having a ketone as a functional group. Examples of the ketone solvent include dimethylacetamide, N-methylpyrrolidone, N-ethylpyrrolidone, γ-butyrolactone, and cyclohexanone. The ketone solvent is preferably a ketone compound having a nitrogen atom, and can be at least one nitrogen-containing ketone solvent selected from the group consisting of dimethylacetamide, N-methylpyrrolidone, N-ethylpyrrolidone, and γ-butyrolactone.

In the present invention, a resin composition (varnish) can be produced by mixing the silica sol and a nitrogen-containing polymer.

The nitrogen-containing polymer can be contained at 1 to 100, 1 to 10, or 1 to 5 parts by mass with respect to 1 part by mass of silica contained in the silica sol.

Examples of the nitrogen-containing polymer include, but are not limited to, polymers, such as polyimide, polyamide, polyamic acid, polyamide-imide, polyetherimide, and polyesterimide.

The mixing of the nitrogen-containing polymer and the silica sol dispersed in the ketone solvent may involve adding the silica sol dispersed in the ketone solvent to the nitrogen-containing polymer and mixing these, or may involve adding the nitrogen-containing polymer to the silica sol dispersed in the ketone solvent and mixing these. Either method can be used.

The silica sol used as a material of the present invention may be a silica sol in an organic solvent prepared by producing an aqueous silica sol and then replacing the solvent of the aqueous silica sol with the organic solvent.

In step (A), silica particles having an average particle size of 5 to 100 nm or 5 to 60 nm can be produced and used as a material of the silica sol.

The aqueous silica sol can be prepared by heating, at 50° C. to 110° C. in the presence of an alkali, a silicate solution with pH 1 to 6 obtained by cation exchange of an alkali silicate solution with a solid concentration of 1% to 10% by mass. The cation exchange treatment can be carried out by contact with a strongly acidic cation exchange resin. The cation exchange treatment can involve causing a treatment liquid to pass through an ion exchange resin packed in a column.

The obtained aqueous silica sol is brought into contact with a strongly basic anion exchange resin to produce a high-purity alkali aqueous silica sol. The high-purity alkali aqueous silica sol is further brought into contact with a strongly acidic cation exchange resin to produce a high-purity acidic aqueous silica sol. To remove impurities or concentrate the solid content, ultrafiltration can be carried out.

The alkali silicate may be, for example, sodium silicate, potassium silicate, or lithium silicate. Examples of the alkali silicate include sodium silicate commercially available under product names, such as sodium water glass No. 1, sodium water glass No. 2, and sodium water glass No. 3. The alkali silicate may be prepared by adding sodium hydroxide, potassium hydroxide, lithium hydroxide, or quaternary ammonium hydroxide to a silicate solution obtained by hydrolysis of an alkoxysilane, such as tetraethoxysilane or tetramethoxysilane.

In the obtained aqueous silica sol, water serving as a dispersion medium can be replaced with methanol by, for example, vacuum distillation or ultrafiltration. Part of methanol serving as a dispersion medium can be replaced by an alcohol solvent other than methanol, such as ethanol, n-propanol, isopropanol, or n-butanol.

In the present invention, a silica sol can be produced by hydrolysis and polycondensation of a hydrolyzable alkoxysilane. Examples of the alkoxysilane include, but are not limited to, tetraethoxysilane and tetramethoxysilane. The alkoxysilane is subjected to hydrolysis and polycondensation in a water-containing solvent to produce a silica sol. Examples of the solvent to be used include, but are not limited to, alcohol solvents, such as methanol, ethanol, n-propanol, isopropanol, n-butanol, ethylene glycol, propylene glycol, and butanediol; ketones, such as acetone and methyl ethyl ketone; esters, such as ethyl acetate; hydrocarbons, such as toluene, xylene, and ethylbenzene; dimethylformamide; and N-methyl-2-pyrrolidone. These solvents can be used as a mixed solvent.

The amount of water is 1 to 10 moles per mole of the alkoxy group of the alkoxysilane.

Examples of alkali catalysts include, but are not limited to, alkali metals, such as sodium hydroxide, potassium hydroxide, and lithium hydroxide; ammonia; quaternary ammonium hydroxide, such as tetramethylammonium hydroxide, and tetraethylammonium hydroxide; amines, such as ethylenediamine, diethylenetriamine, triethylenetetramine, urea, and ethanolamine.

In the present invention, the $SiO_2$ concentration in the dispersion is 0.1% to 50% by mass. The average particle size of the silica particles can be 5 to 100 nm. The average particle size can be a particle size determined by dynamic light scattering. The particle size determined by dynamic light scattering is measured at, for example, a $SiO_2$ concentration of 1.5% by mass.

In step (B) in the present invention, the aqueous medium of the aqueous silica sol obtained by the above method is replaced with methanol. The solvent replacement with methanol uses evaporation with an evaporator or ultrafiltration. The hydrolysis, into silanol groups, of methoxy groups formed by methoxylation of silanol groups with methanol can be reduced by minimizing the water content in the silica sol dispersed in methanol used in step (C). In the equilibrium between the hydroxyl groups of silanol groups and the methoxy groups formed by methoxylation of silanol groups as described above, the water content in the methanol solvent is preferably 3% by mass or less, for example, preferably 2% by mass or less.

Step (C) in the present invention involves causing the silica sol dispersed in methanol prepared in step (B) to react with the silane coupling agent of the formula (1). In the reaction with the silane coupling agent of the formula (1), the hydrolyzable group corresponding to $R^2$ in the formula (1) needs to be hydrolyzed, and the water in the silica sol dispersed in methanol prepared in step (B) above can be used as hydrolysis water. For example, the silica sol dispersed in the methanol solvent can contain water in the range of 0.001% by mass or more and 2% by mass or less, or 0.005% by mass or more and 2.0% by mass or less, or 0.1% by mass or more and 2.0% by mass or less.

The silane coupling agent of the formula (1) is added to the silica sol dispersed in methanol to cause reaction at 40° C. to 100° C., 40° C. to 80° C., or 50° C. to 70° C., or typically at 60° C., for about 0.1 to 20 hours. The reaction time is not set but preferably sufficient to reach equilibrium of coating of the silica particles with the silane coupling agent.

Step (D) in the present invention involves replacing the methanol solvent of the surface-modified silica sol dispersed in methanol prepared in step (C) with the ketone solvent. The solvent replacement with the ketone solvent uses evaporation with an evaporator or ultrafiltration.

The silica concentration of the silica sol dispersed in the ketone solvent can be adjusted to 20% by mass to 50% by mass. The obtained silica particles dispersed in the ketone solvent has a particle size in the range of 5 to 100 nm. The particle size can be an average particle size determined by dynamic light scattering.

EXAMPLES (Analytical Method)
[Measurement of $SiO_2$ Concentration]
The silica sol was placed in a crucible and dried at 150° C. The resulting gel was baked at 1000° C., and the residue after baking was weighed to calculate the $SiO_2$ concentration.

[Measurement of Average Primary Particle Size (Particle Size Determined by Nitrogen Adsorption Method)]
The specific surface area of 300° C.-dried powder of an acidic silica sol was measured by using a specific surface area analyzer Monosorb (registered trademark) MS-16 (available from Yuasa Ionics Co., Ltd.).

[Measurement of Water Content]

The water content was determined by Karl Fischer titration.

[Measurement of Viscosity of Silica Sol]

The viscosity of the silica sol was measured by using an Ostwald viscometer.

[Measurement of Amount of Bonding of Unsaturated Bond-Containing Organic Group and Alkoxy Group]

(1) To a 30 cc-centrifuge tube, 3 ml of a silica sol dispersed in a ketone solvent is placed, and 20 mL of toluene is added.

(2) The mixture is centrifuged (5000 rpm×30 minutes), and the supernatant is removed.

(3) The gel is dissolved again by addition of 4 mL of acetone, and 10 mL of toluene and 4 mL of hexane are then added, followed by centrifugation (5000 rpm×30 minutes).

(4) Steps (2) to (3) are performed again.

(5) The resulting gel is vacuum-dried at 60° C., and the resulting powder is crushed in a mortar and dried at 150° C. for 2 hours.

The carbon content of the powder prepared above was measured by using an elemental analyzer.

The powder (0.2 g) prepared above was mixed with and dissolved in 10 mL of 0.05 N sodium hydroxide aqueous solution and subjected to gas chromatography to determine the amount of alkoxy groups bonded to the surfaces.

The amount of unsaturated bonding group-containing organic groups bonded to the surfaces was determined by subtracting the amount of alkoxy groups obtained by gas chromatography (GC) and the carbon content corresponding to the adsorbed solvent (e.g., dimethylacetamide (DMAC)) from the carbon content of the powder obtained by the elemental analysis.

[Measurement of Viscosity of Varnish]

The viscosity of the resin varnish was measured by using a B-type viscometer (Toki Sangyo Co., Ltd, B-type viscometer model BM II).

Example 1

A silica sol dispersed in water (average primary particle size: 12 nm, pH 3, silica concentration: 33% by mass, available from Nissan Chemical Corporation) was provided.

The silica sol (1000 g) was placed in a glass reactor having an inner volume of 2 L and equipped with a stirrer, a condenser, a thermometer, and two inlets. While the sol in the reactor was boiled, the vapor of methanol generated in a separate boiler was continuously blown into the silica sol in the reactor to replace water with methanol with the liquid level gradually increasing. When the volume of the distillate reached 9 L, the replacement was terminated to yield 1100 g of silica sol dispersed in methanol. The obtained silica sol dispersed in methanol had a $SiO_2$ concentration of 30.5% by mass, a water content of 1.6% by mass, and a viscosity of 2 mPa s.

The sol in methanol (1000 g) was placed in a 2 L-recovery flask. While the sol in methanol was stirred with a magnetic stirrer, 75.9 g of phenyltrimethoxysilane (product name: KBM-103 available from Shin-Etsu Chemical Co., Ltd.) was added to the sol in methanol, and the liquid temperature was then maintained at 60° C. for 6 hours.

Subsequently, dimethylacetamide (DMAC) was supplied while the solvent was distilled off by evaporation in a rotatory evaporator under a reduced pressure of 450 to 110 Torr at a bath temperature of 85° C. to 125° C., whereby the dispersion medium of the sol was replaced with DMAC to produce a transparent colorless silica sol dispersed in DMAC ($SiO_2$: 30.5% by mass, viscosity (20° C.): 5 mPa s, water content: 0.1% by mass, methanol: 1.5% by mass, particle size determined by dynamic light scattering: 18 nm, the amount of phenyl groups bonded to silica particles: 1.1 groups/nm$^2$, the amount of methoxy groups bonded to silica particles: 0.7 groups/nm$^2$, (carbon-carbon unsaturated bond-containing organic group)/(methoxy group)=1.53).

The obtained sol was added to and mixed with a polyamide-imide insulating resin varnish (product name: HPC-5012-32 available from Hitachi Chemical Co., Ltd., resin solid content: 32% by mass, NMP solvent) in a glass bottle such that resin/$SiO_2$=75/25). After the glass bottle was vigorously shaken by the hand about 10 times, the mixture was mixed by using a mix rotor (product name MR-5 available from AS ONE Corporation) at 23° C. for 12 hours to produce a silica-blended polyamide-imide resin varnish.

The obtained varnish had a transparent appearance after 2 weeks like the original polyamide-imide resin varnish.

The initial viscosity of the varnish was 1560 cps. The viscosity of the varnish was 1620 cps after 2-week storage at 23° C. and 2000 cps after 4-week storage at 23° C.

Example 2

A silica sol dispersed in water (average primary particle size: 12 nm, pH 3, silica concentration: 33% by mass, available from Nissan Chemical Corporation) was provided.

The silica sol (1000 g) was placed in a glass reactor having an inner volume of 2 L and equipped with a stirrer, a condenser, a thermometer, and two inlets. While the sol in the reactor was boiled, the vapor of methanol generated in a separate boiler was continuously blown into the silica sol in the reactor to replace water with methanol with the liquid level gradually increasing. When the volume of the distillate reached 11 L, the replacement was terminated to yield 1100 g of silica sol dispersed in methanol. The obtained silica sol dispersed in methanol had a $SiO_2$ concentration of 30.5% by mass, a water content of 0.5% by mass, and a viscosity of 2 mPa s.

The sol in methanol (1000 g) was placed in a 2 L-recovery flask. While the sol in methanol was stirred with a magnetic stirrer, 75.9 g of phenyltrimethoxysilane (product name: KBM-103 available from Shin-Etsu Chemical Co., Ltd.) was added to the sol in methanol, and the liquid temperature was then maintained at 60° C. for 6 hours.

Subsequently, dimethylacetamide (DMAC) was supplied while the solvent was distilled off by evaporation in a rotatory evaporator under a reduced pressure of 450 to 110 Torr at a bath temperature of 85° C. to 125° C., whereby the dispersion medium of the sol was replaced with DMAC to produce a transparent colorless silica sol dispersed in DMAC ($SiO_2$: 30.5% by mass, viscosity (20° C.): 5 mPa s, water content: 0.1% by mass, methanol: 1.5% by mass, particle size determined by dynamic light scattering: 18 nm, the amount of phenyl groups bonded to silica particles: 1.0 group/nm$^2$, the amount of methoxy groups bonded to silica particles: 1.2 groups/nm$^2$, (carbon-carbon unsaturated bond-containing organic group)/(methoxy group)=0.81).

A silica-blended polyamide-imide resin varnish was produced by the same method as that in Example 1 using the obtained sol. The obtained varnish had a transparent appearance after 4 weeks like the original polyamide-imide resin varnish.

The initial viscosity of the varnish was 1280 cps. The viscosity of the varnish was 1240 cps after 2-week storage at 23° C. and 1320 cps after 4-week storage at 23° C.

Example 3

A silica sol dispersed in water (average primary particle size: 45 nm, pH 3, silica concentration: 20% by mass, available from Nissan Chemical Corporation) was provided.

The silica sol (2500 g) was placed in a glass reactor having an inner volume of 2 L and equipped with a stirrer, a condenser, a thermometer, and two inlets. While the sol in the reactor was boiled, the vapor of methanol generated in a separate boiler was continuously blown into the silica sol in the reactor to replace water with methanol with the liquid level decreasing. When the volume of the distillate reached 9 L, the replacement was terminated to yield 1250 g of silica sol dispersed in methanol. The obtained silica sol dispersed in methanol had a $SiO_2$ concentration of 40.5% by mass, a water content of 1.5% by mass, and a viscosity of 2 mPa s.

The sol in methanol (1000 g) was placed in a 2 L-recovery flask. While the sol in methanol was stirred with a magnetic stirrer, 24.0 g of phenyltrimethoxysilane (product name: KBM-103 available from Shin-Etsu Chemical Co., Ltd.) was added to the sol in methanol, and the liquid temperature was then maintained at 60° C. for 6 hours.

Subsequently, dimethylacetamide (DMAC) was supplied while the solvent was distilled off by evaporation in a rotatory evaporator under a reduced pressure of 450 to 110 Torr at a bath temperature of 85° C. to 125° C., whereby the dispersion medium of the sol was replaced with DMAC to produce a transparent colorless silica sol dispersed in DMAC ($SiO_2$: 30.5% by mass, viscosity (20° C.): 5 mPa s, water content: 0.1% by mass, methanol: 1.0% by mass, particle size determined by dynamic light scattering: 90 nm, the amount of phenyl groups bonded to silica particles: 1.5 groups/$nm^2$, the amount of methoxy groups bonded to silica particles: 0.4 groups/$nm^2$, (carbon-carbon unsaturated bond-containing organic group)/(methoxy group)=3.68).

A silica-blended polyamide-imide resin varnish was produced by the same method as that in Example 1 using the obtained sol. The obtained varnish had a transparent appearance after 4 weeks like the original polyamide-imide resin varnish.

The initial viscosity of the varnish was 1140 cps. The viscosity of the varnish was 1200 cps after 2-week storage at 23° C. and 1200 cps after 4-week storage at 23° C.

Example 4

A silica sol dispersed in water (average primary particle size: 45 nm, pH 3, silica concentration: 20% by mass, available from Nissan Chemical Corporation) was provided.

The silica sol (2500 g) was placed in a glass reactor having an inner volume of 2 L and equipped with a stirrer, a condenser, a thermometer, and two inlets. While the sol in the reactor was boiled, the vapor of methanol generated in a separate boiler was continuously blown into the silica sol in the reactor to replace water with methanol with the liquid level decreasing. When the volume of the distillate reached 9 L, the replacement was terminated to yield 1250 g of silica sol dispersed in methanol. The obtained silica sol dispersed in methanol had a $SiO_2$ concentration of 40.5% by mass, a water content of 1.5% by mass, and a viscosity of 2 mPa s.

The sol in methanol (1000 g) was placed in a 2 L-recovery flask. While the sol in methanol was stirred with a magnetic stirrer, 10.0 g of 3-methacryloxypropyltrimethoxysilane (product name: KBM-503 available from Shin-Etsu Chemical Co., Ltd.) was added to the sol in methanol, and the liquid temperature was then maintained at 60° C. for 3 hours. Diisopropylethylamine (0.93 g) was added, and cyclohexanone was supplied while the solvent was distilled off by evaporation in a rotatory evaporator under a reduced pressure of 450 to 110 Torr at a bath temperature of 85° C. to 125° C., whereby the dispersion medium of the sol was replaced with cyclohexanone to produce a transparent, pale yellow silica sol dispersed in cyclohexanone ($SiO_2$: 30.5% by mass, viscosity (20° C.): 9 mPa s, water content: 0.1% by mass, methanol: 1.0% by mass, particle size determined by dynamic light scattering: 90 nm, the amount of methacryloxypropyl groups bonded to silica particles: 1.0 group/$nm^2$, the amount of methoxy groups bonded to silica particles: 1.1 groups/$nm^2$, (carbon-carbon unsaturated bond-containing organic group)/(methoxy group)=0.94).

A silica-blended polyamide-imide resin varnish was produced by the same method as that in Example 1 using the obtained sol. The obtained varnish had a transparent appearance after 2 weeks like the original polyamide-imide resin varnish.

The initial viscosity of the varnish was 1320 cps. The viscosity of the varnish was 1600 cps after 2-week storage at 23° C. and 1640 cps after 4-week storage at 23° C.

Example 5

A silica sol dispersed in water (average primary particle size: 20 nm, pH 3, silica concentration: 25% by mass, available from Nissan Chemical Corporation) was provided.

The silica sol (1350 g) was placed in a glass reactor having an inner volume of 2 L and equipped with a stirrer, a condenser, a thermometer, and two inlets. While the sol in the reactor was boiled, the vapor of methanol generated in a separate boiler was continuously blown into the silica sol in the reactor to replace water with methanol with the liquid level gradually increasing. When the volume of the distillate reached 12 L, the replacement was terminated to yield 1100 g of silica sol dispersed in methanol. The obtained silica sol dispersed in methanol had a $SiO_2$ concentration of 30.5% by mass, a water content of 1.6% by mass, and a viscosity of 2 mPa s.

The sol in methanol (1000 g) was placed in a 2 L-recovery flask. While the sol in methanol was stirred with a magnetic stirrer, 16.9 g of phenyltrimethoxysilane (product name: KBM-103 available from Shin-Etsu Chemical Co., Ltd.) was added to the sol in methanol, and the liquid temperature was then maintained at 60° C. for 1 hour. Next, 2.4 g of N,N-diisopropylethylamine was added, and the liquid temperature was maintained at 60° C. for 1 hour. Subsequently, 15.6 g of phenyltrimethoxysilane was added, and the liquid temperature was maintained at 60° C. for 6 hours. Dimethylacetamide (DMAC) was supplied while the solvent was distilled off by evaporation in a rotatory evaporator under a reduced pressure of 450 to 110 Torr at a bath temperature of 85° C. to 125° C., whereby the dispersion medium of the sol was replaced with DMAC to produce a transparent colorless silica sol dispersed in DMAC ($SiO_2$: 30.5% by mass, viscosity (20° C.): 5 mPa s, water content: 0.1% by mass, methanol: 0.1% by mass, particle size determined by dynamic light scattering: 21 nm, the amount of phenyl groups bonded to silica particles: 1.0 group/$nm^2$, the amount of methoxy groups bonded to silica particles: 1.1 groups/$nm^2$, (carbon-carbon unsaturated bond-containing organic group)/(methoxy group)=0.94).

The obtained sol was added to and mixed with a polyamide-imide insulating resin varnish (product name: HPC-5012-32 available from Hitachi Chemical Co., Ltd., resin solid content: 32% by mass, NMP solvent) in a glass bottle such that resin/$SiO_2$=75/25). After the glass bottle was vigorously shaken by the hand about 10 times, the mixture was mixed by using a mix rotor (product name MR-5 available from AS ONE Corporation) at 23° C. for 12 hours to produce a silica-blended polyamide-imide resin varnish.

The obtained varnish had a transparent appearance after 2 weeks like the original polyamide-imide resin varnish.

The initial viscosity of the varnish was 1120 cps. The viscosity of the varnish was 1160 cps after 2-week storage at 23° C. and 1180 cps after 4-week storage at 23° C.

Example 6

The silica sol dispersed in DMAC obtained in Example 5 was added to and mixed with a polyamide-imide insulating resin varnish (product name: HPC-5012-32 available from Hitachi Chemical Co., Ltd., resin solid content: 32% by mass, NMP solvent) in a glass bottle such that resin/$SiO_2$=85/15). After the glass bottle was vigorously shaken by the hand about 10 times, the mixture was mixed by using a mix rotor (product name MR-5 available from AS ONE Corporation) at 23° C. for 12 hours to produce a silica-blended polyamide-imide resin varnish.

The obtained varnish had a transparent appearance after 4-week storage at 50° C. like the original polyamide-imide resin varnish.

The initial viscosity of the varnish was 2180 cps. The viscosity of the varnish was 2000 cps after 2-week storage at 50° C. and 2300 cps after 4-week storage at 50° C.

Example 7

The silica sol dispersed in DMAC (100 g) obtained in Example 5 was placed in a 500 mL-recovery flask, and 5.0 g of 1-butanol was added. Dimethylacetamide (DMAC) was then supplied while the solvent was distilled off by evaporation in a rotatory evaporator under a reduced pressure of 110 Torr at a bath temperature of 125° C., whereby the dispersion medium of the sol was replaced with DMAC to produce a transparent colorless silica sol dispersed in DMAC ($SiO_2$: 30.5% by mass, viscosity (20° C.): 5 mPa s, water content: 0.1% by mass, methanol: 0.1% by mass, particle size determined by dynamic light scattering: 19 nm, the amount of phenyl groups bonded to silica particles: 1.0 group/$nm^2$, the amount of methoxy groups bonded to silica particles: 0.9 groups/$nm^2$, the amount of butoxy groups bonded to silica particles: 0.1 groups/$nm^2$, (carbon-carbon unsaturated bond-containing organic group)/(methoxy group+butoxy group)=1.00).

The obtained sol was added to and mixed with a polyamide-imide insulating resin varnish (product name: HPC-5012-32 available from Hitachi Chemical Co., Ltd., resin solid content: 32% by mass, NMP solvent) in a glass bottle such that resin/$SiO_2$=75/25). After the glass bottle was vigorously shaken by the hand about 10 times, the mixture was mixed by using a mix rotor (product name MR-5 available from AS ONE Corporation) at 23° C. for 12 hours to produce a silica-blended polyamide-imide resin varnish.

The obtained varnish had a transparent appearance after 2 weeks like the original polyamide-imide resin varnish.

The initial viscosity of the varnish was 1220 cps. The viscosity of the varnish was 1180 cps after 2-week storage at 23° C. and 1240 cps after 4-week storage at 23° C.

Example 8

The silica sol dispersed in DMAC obtained in Example 7 was added to and mixed with a polyamide-imide insulating resin varnish (product name: HPC-5012-32 available from Hitachi Chemical Co., Ltd., resin solid content: 32% by mass, NMP solvent) in a glass bottle such that resin/$SiO_2$=85/15). After the glass bottle was vigorously shaken by the hand about 10 times, the mixture was mixed by using a mix rotor (product name MR-5 available from AS ONE Corporation) at 23° C. for 12 hours to produce a silica-blended polyamide-imide resin varnish.

The obtained varnish had a transparent appearance after 2 weeks like the original polyamide-imide resin varnish.

The initial viscosity of the varnish was 2220 cps. The viscosity of the varnish was 2230 cps after 2-week storage at 50° C. and 2380 cps after 4-week storage at 50° C.

Comparative Example 1

A silica sol dispersed in water (average primary particle size: 12 nm, pH 3, silica concentration: 33% by mass, available from Nissan Chemical Corporation) was provided.

The silica sol (1000 g) was placed in a 2 L-recovery flask, and 500 g of dimethylacetamide (DMAC) was added. DMAC was supplied while the solvent was distilled off by evaporation in a rotatory evaporator under a reduced pressure of 200 to 100 Torr at a bath temperature of 85° C. to 125° C., whereby the dispersion medium of the sol was replaced with DMAC to produce a transparent colorless silica sol dispersed in DMAC ($SiO_2$: 20.5% by mass, viscosity (20° C.): 3 mPa s, water content: 0.9% by mass, particle size determined by dynamic light scattering: 18 nm).

A silica-blended polyamide-imide resin varnish was produced by the same method as that in Example 1 using the obtained sol. The obtained varnish initially showed a cloudy appearance and contained aggregated silica particles.

The initial viscosity of the varnish was 1560 cps. After 2-week storage at 23° C., the varnish had a viscosity of 1520 cps and still showed a cloudy appearance.

Comparative Example 2

A silica sol dispersed in water (average primary particle size: 12 nm, pH 3, silica concentration: 33% by mass, available from Nissan Chemical Corporation) was provided.

The silica sol (1000 g) was placed in a 3 L-recovery flask, and 900 g of dimethylacetamide (DMAC) was added. The silica sol was concentrated in a rotatory evaporator under a reduced pressure of 150 Torr at a bath temperature of 100° C. to 110° C. To the sol ($SiO_2$: 25% by mass, water content: 18% by mass) after concentration, 1.5 g of diisopropylethylamine was added and stirred, and 80.4 g of phenyltrimethoxysilane was added. The resulting mixture was maintained at 70° C. for 3 hours. Subsequently, replacement with DMAC was performed under a reduced pressure of 150 to 100 Torr at a bath temperature of 110° C. to 120° C. to produce a transparent colorless silica sol dispersed in DMAC ($SiO_2$: 30.5% by mass, viscosity (20° C.): 4 mPa s, water content: 0.1% by mass, particle size determined by dynamic light scattering: 18 nm, the amount of phenyl groups bonded to silica particles: 1.0 group/$nm^2$, the amount of methoxy groups bonded to silica particles: 0.02 groups/$nm^2$, (carbon-carbon unsaturated bond-containing organic group)/(methoxy group)=66.5).

A silica-blended polyamide-imide resin varnish was produced by the same method as that in Example 1 using the obtained sol. The obtained varnish initially showed a very cloudy appearance and contained aggregated silica particles.

The initial viscosity of the varnish was 2600 cps. The viscosity of the varnish was 2800 cps after 2-week storage at 23° C. and 2760 cps after 4-week storage at 23° C. The appearance was cloudy.

Comparative Example 3

A silica sol dispersed in water (average primary particle size: 45 nm, pH 3, silica concentration: 20% by mass, available from Nissan Chemical Corporation) was provided.

The silica sol (1000 g) was placed in a 2 L-recovery flask, and 500 g of dimethylacetamide (DMAC) was added. DMAC was supplied while the solvent was distilled off by evaporation under a reduced pressure of 200 to 100 Torr at a bath temperature of 85° C. to 125° C. in a rotatory evaporator, whereby the dispersion medium of the sol was replaced with DMAC to produce a transparent colorless silica sol dispersed in DMAC ($SiO_2$: 30.5% by mass, viscosity (20° C.): 5 mPa s, water content: 0.9% by mass, particle size determined by dynamic light scattering: 90 nm).

A silica-blended polyamide-imide resin varnish was produced by the same method as that in Example 1 using the obtained sol. The obtained varnish initially showed a very cloudy appearance and contained aggregated silica particles.

The initial viscosity of the varnish was 2480 cps. After 2-week storage at 23° C., the varnish had a viscosity of 2640 cps and still showed a very cloudy appearance.

Comparative Example 4

A silica sol dispersed in water (average primary particle size: 12 nm, pH 3, silica concentration: 33% by mass, available from Nissan Chemical Corporation) was provided.

The silica sol (1000 g) was placed in a glass reactor having an inner volume of 2 L and equipped with a stirrer, a condenser, a thermometer, and two inlets. While the sol in the reactor was boiled, the vapor of methanol generated in a separate boiler was continuously blown into the silica sol in the reactor to replace water with methanol with the liquid level gradually increasing. When the volume of the distillate reached 9 L, the replacement was terminated to yield 1100 g of silica sol dispersed in methanol. The obtained silica sol dispersed in methanol had a $SiO_2$ concentration of 30.5% by mass, a water content of 1.6% by mass, and a viscosity of 2 mPa s.

The sol in methanol (1000 g) was placed in a 2 L-recovery flask, and dimethylacetamide (DMAC) was supplied while the solvent was distilled off by evaporation under a reduced pressure of 450 to 110 Torr at a bath temperature of 85° C. to 125° C. in a rotatory evaporator, whereby the dispersion medium of the sol was replaced with DMAC to produce a transparent colorless silica sol dispersed in DMAC ($SiO_2$: 30.5% by mass, viscosity (20° C.): 7 mPa s, water content: 0.1% by mass, methanol: 1.5% by mass, particle size determined by dynamic light scattering: 18 nm, the amount of methoxy groups bonded to silica particles: 0.3 groups/ $nm^2$, (carbon-carbon unsaturated bond-containing organic group)/(methoxy group)=0).

A silica-blended polyamide-imide resin varnish was produced by the same method as that in Example 1 using the obtained sol. The obtained varnish initially showed a very cloudy appearance and contained aggregated silica particles.

The initial viscosity of the varnish was 2760 cps. After 2-week storage at 23° C., the varnish had a viscosity of 3320 cps, but still showed a very cloudy appearance.

(Transparency Test for Silica-Blended Polyamide-Imide Resin Varnish)

The silica-blended polyamide-imide resin varnish of Example 2, the silica-blended polyamide-imide resin varnish of Comparative Example 2, and a polyamide-imide resin varnish of reference were placed in the respective transparent glass vials, and name plates were inserted in the respective glass vials. The characters on the name plates were observed from the outside of the glass vials.

The characters on the name plates can be recognized when the silica-blended polyamide-imide resin varnish has high transparency. The name plate in the silica-blended polyamide-imide resin varnish of Example 2 could be recognized as clearly as that in the polyamide-imide resin varnish of reference. The characters on name plate could not be recognized because the silica-blended polyamide-imide resin varnish of Comparative Example 2 was cloudy.

Figure 1:
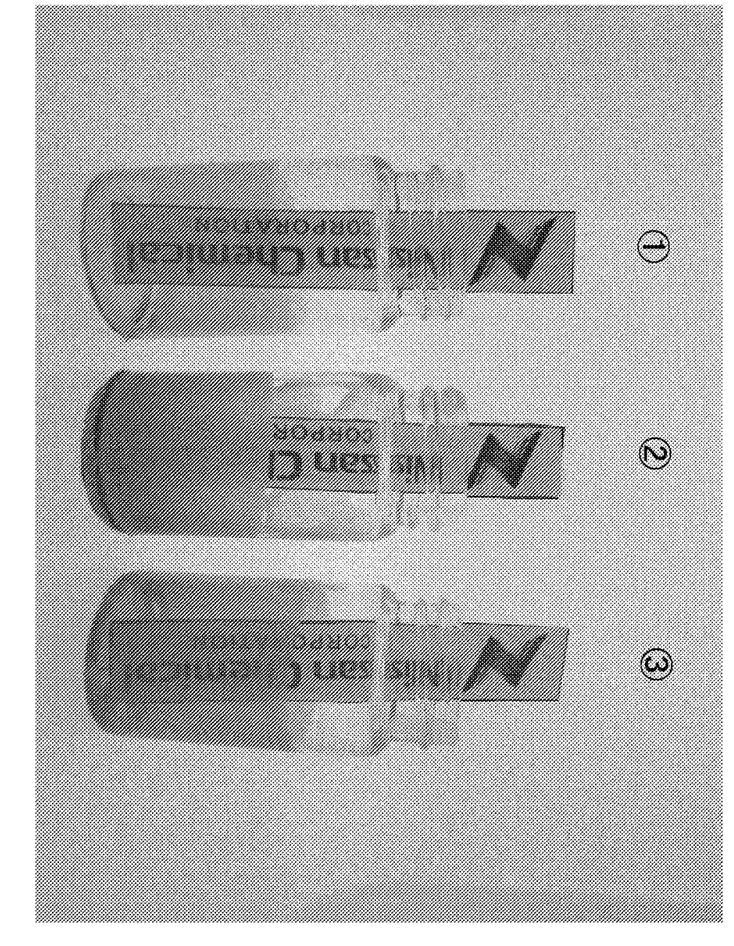
FIG. 1 is a photograph illustrating transparency test results of a silica-blended polyamide-imide resin varnish.

The photograph of FIG. 1 shows, in order from the left, the polyamide-imide resin varnish (1) of reference, the silica-blended polyamide-imide resin varnish (2) of Comparative Example 2, and the silica-blended polyamide-imide resin varnish (3) of Example 2.

(Film Forming Test)

With the silica-blended polyamide-imide resin varnishes produced in Example 2 and Comparative Example 2, 13 ml-transparent glass bottles were dipped at room temperature to form coating films on the outer surfaces of the glass bottles. The coating films were cured by heating at 200° C. for 30 minutes and further at 270° C. for 30 minutes. The original polyamide-imide resin varnish was also cured as reference.

The coating film formed of the silica-blended polyamide-imide resin varnish of Example 2 maintained its transparency after curing, while the coating film formed of the silica-blended polyamide-imide resin varnish of Comparative Example 2 showed significantly low transparency.

Example 9

(Production and Evaluation of Insulating Wire)

A silica sol dispersed in DMAC (1.7 kg) produced by the same method as that for the silica sol dispersed in DMAC described in Example 5 was placed in a 10 L-plastic container. While the silica sol dispersed in DMAC was stirred with a mechanical stirrer, 9.3 kg of a polyamide-imide insulating resin varnish (product name: HPC-5012-32 available from Hitachi Chemical Co., Ltd., resin solid content: 32% by mass, NMP solvent) was added, and the mixture was stirred at room temperature for 2 hours to produce a silica sol-blended polyamide-imide resin varnish (resin/$SiO_2$=85/15).

The polyamide-imide resin varnish (product name: HPC-5012-32 available from Hitachi Chemical Co., Ltd.) was applied to and baked on a copper conductor (0.4 mm in diameter) to form an insulating layer with a thickness of 4 sm. The silica sol-blended polyamide-imide resin varnish produced above was then applied to and baked on the copper conductor to produce an insulating wire having an insulating layer with a thickness of 20 μm.

For reference example, the polyamide-imide insulating resin varnish (product name: HPC-5012-32 available from Hitachi Chemical Co., Ltd.) was applied to and baked on a copper conductor (0.4 mm in diameter) to produce an insulating wire having an insulating layer with a thickness of 20 μm.

The flexibility, breakdown voltage, and insulation life (V-t test) of the insulating wires produced above were evaluated. The evaluation methods and conditions are described below.

(Flexibility)

In accordance with JIS C 3216-3 section 5, an acceptable winding multiplied diameter at which no cracking occurred in a coating film was investigated (using an enameled wire with no elongation and an enameled wire after 20% elongation).

In flexibility testing (no elongation), the insulating wire without elongation was wound around a winding rod having a diameter 1 to 10 times the conductor diameter of the insulating wire, and the minimum winding multiplied diameter at which no cracking was observed in the insulating coating film using an optical microscope was determined.

In flexibility testing (20% elongation), the insulating wire was elongated 20%. The insulating wire was then subjected to the same testing as described above (no elongation).

In the results of flexibility testing, 1d: the minimum winding multiplied diameter at which no cracking occurred was the self-diameter, 2d: the minimum winding multiplied diameter at which no cracking occurred was twice the self-diameter, and 3d: the minimum winding multiplied diameter at which no cracking occurred was three times the self-diameter. It is said that the smaller the minimum winding multiplied diameter d is, the better the flexibility is.

(Breakdown Voltage)

In accordance with JIS C 3216-5 section 4, the voltage at which breakdown occurred was measured by applying an AC voltage of 50 Hz across two wires of a twisted-pair sample. The voltage rising rate was 500 V/s, and the breakdown detection current was 5 mA.

(V-t Test)

In accordance with JIS C 3216-5 section 4, a twisted-pair sample was prepared and placed in an environment at a temperature of 155° C. The following voltage was applied across two wires of the twisted-pair sample to measure the time until breakdown.

Frequency: 10 kHz rectangular pulse
Pulse width: 5 μs
Bipolar
Pulse rise time: 80 ns

TABLE 1

|  | Example 9 | Reference Example |
|---|---|---|
| Silica content (% by mass) in insulating film | 15 | 0 |
| Flexibility (no elongation) | 1 d | 1 d |
| Flexibility (20% elongation) | 1 d | 1 d |
| Breakdown voltage (kV) | 10.0 | 9.7 |
| Insulation life (hours) measured at 1.5 kVp | 2.9 | 0.08 |
| Insulation life (hours) measured at 1.2 kVp | 8.8 | 0.12 |
| Insulation life (hours) measured at 0.9 kVp | 134 | 0.17 |

In reference example, the insulating film is composed only of polyamide-imide insulating resin varnish.

The insulating wire produced in Example 9 had much longer insulation life while maintaining its mechanical properties and breakdown voltage than the wire coated with silica-free polyamide-imide.

INDUSTRIAL APPLICABILITY

A silica-blended resin varnish can be produced by mixing a silica sol that has a high dispersibility and is dispersed in a ketone organic solvent, and a polymer containing carbonyl groups and nitrogen atoms, such as polyimide, polyamide, polyimide-amide, or polyesterimide, which is a resin having high electrical insulation. This silica-blended resin varnish can be applied to wire materials or substrate materials requiring high electrical insulation as well as high impact resistance, high abrasion resistance and high transparency for coating. In particular, the silica-blended resin varnish is suitably used as an insulating coating material for enameled wires for motors of electric vehicles, hybrid vehicles, etc. which requires surge resistance and high flexibility.

The invention claimed is:

1. A sol (silica sol) in which silica particles are dispersed in a ketone solvent, the silica particles having an average particle size of 5 to 100 nm and having a carbon-carbon unsaturated bond-containing organic group and an alkoxy group bonded to surfaces thereof,
   wherein the carbon-carbon unsaturated bond-containing organic group is bonded at 0.5 to 2.0 groups per unit area (nm$^2$) of the surfaces of the silica particles,
   the alkoxy group is bonded at 0.1 to 2.0 groups per unit area (nm$^2$) of the surfaces of the silica particles, and
   a molar ratio of {(the carbon-carbon unsaturated bond-containing organic group)/(the alkoxy group)} is 0.5 to 5.0.

2. The silica sol according to claim 1, wherein the carbon-carbon unsaturated bond-containing organic group is a phenyl group or a phenyl group-containing organic group, or a (meth)acryloyl group or a (meth)acryloyl group-containing organic group.

3. The silica sol according to claim 1, wherein the carbon-carbon unsaturated bond-containing organic group is a phenyl group, a phenylaminoalkyl group, a (meth)acryloyl group, or a (meth)acryloylalkyl group.

4. The silica sol according to claim 1, wherein the ketone solvent is dimethylacetamide, N-methylpyrrolidone, N-ethylpyrrolidone, γ-butyrolactone, or cyclohexanone.

5. The silica sol according to claim 1, wherein the ketone solvent is at least one ketone solvent selected from the group consisting of dimethylacetamide, N-methylpyrrolidone, N-ethylpyrrolidone, and γ-butyrolactone.

6. An insulating resin composition comprising: the silica sol according to claim 1; and a nitrogen-containing polymer.

7. The insulating resin composition according to claim 6, wherein the nitrogen-containing polymer is present at 1 to 100 parts by mass with respect to 1 part by mass of silica contained in the silica sol.

8. The insulating resin composition according to claim 6, wherein the nitrogen-containing polymer is polyimide, polyamide, polyamic acid, polyamide-imide, polyetherimide, or polyesterimide.

9. A method for producing the silica sol according to claim 1, the method comprising the following steps (A) to (D):
   step (A): a step of preparing an aqueous silica sol having an average particle size of 5 to 100 nm;
   step (B): a step of replacing an aqueous medium of the aqueous silica sol with methanol;
   step (C): a step of causing the silica sol dispersed in methanol prepared in step (B) to react with a silane coupling agent represented by the following formula (1); and
   step (D): a step of replacing a methanol solvent of the surface-modified silica sol dispersed in methanol prepared in step (C) with a ketone solvent, Formula 1)

[in the formula (1), $R^1$ represents a carbon-carbon unsaturated bond-containing organic group, $R^2$ represents an alkoxy group, an acyloxy group, or a halogen group, and a represents an integer of 1 to 3].

10. The method for producing the silica sol according to claim 9, wherein the reaction in step (C) proceeds at 40° C. to 100° C. for 0.1 to 20 hours.

\* \* \* \* \*